(12) United States Patent
Katsuda et al.

(10) Patent No.: US 7,252,303 B2
(45) Date of Patent: Aug. 7, 2007

(54) INFLATOR

(75) Inventors: Nobuyuki Katsuda, Hyogo (JP); Masayuki Nakayasu, Hyogo (JP); Naoki Matsuda, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 100 days.

(21) Appl. No.: 10/332,067

(22) PCT Filed: Aug. 28, 2001

(86) PCT No.: PCT/JP01/07370

§ 371 (c)(1),
(2), (4) Date: Jan. 3, 2003

(87) PCT Pub. No.: WO02/18182

PCT Pub. Date: Mar. 7, 2002

(65) Prior Publication Data

US 2003/0098572 A1   May 29, 2003

(30) Foreign Application Priority Data

| Aug. 29, 2000 | (JP) | ............................. | 2000-258460 |
| Aug. 29, 2000 | (JP) | ............................. | 2000-258461 |
| Sep. 8, 2000  | (JP) | ............................. | 2000-273803 |
| Apr. 9, 2001  | (JP) | ............................. | 2001-109473 |
| Apr. 9, 2001  | (JP) | ............................. | 2001-109474 |
| Jun. 29, 2001 | (JP) | ............................. | 2001-199331 |

(51) Int. Cl.
*B60R 21/26* (2006.01)

(52) U.S. Cl. .................. 280/736; 280/737; 280/741

(58) Field of Classification Search ............... 280/736, 280/737, 740–742, 738
See application file for complete search history.

(56) References Cited

U.S. PATENT DOCUMENTS 3,680,886 A   8/1972   Mazelsky
3,806,153 A   4/1974   Johnson (Continued)

FOREIGN PATENT DOCUMENTS

EP    0602862 A1   6/1994

(Continued)

OTHER PUBLICATIONS

Adams, B. E. and Labib, M. E., "Fundamentals of a Stored Liquefied Gas Inflator," 1999 SAE International Congress and Exposition, Detroit, MI, Mar. 1-4, 1999, pp. 127-135.

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

An inflator has an inflator housing accommodating a pressurized medium, a diffuser portion attached to an end portion of the inflator housing and provided with a gas discharging port for discharging the pressurized medium flowing out of the opening at the time of actuation of the inflator, the gas discharging port being constantly open, such that pressure inside the diffuser portion is under an atmospheric pressure, a rupturable plate that seals a flow-path through which the pressurized medium flows when the inflator is actuated, a rupturing unit for rupturing the rupturable plate to allow the pressurized medium to flow through the flow-path, and a filter provided directly over and covering the discharging port by making contact with a surface of the diffuser portion at a portion defining the gas discharging port, such that the pressurized medium is discharged from the gas discharging port through the filter.

11 Claims, 6 Drawing Sheets

U.S. PATENT DOCUMENTS

| | | |
|---|---|---|
| 5,257,817 A | 11/1993 | Cuevas |
| 5,513,572 A | 5/1996 | Frantom et al. |
| 5,527,066 A | 6/1996 | Svensson |
| 5,542,702 A | 8/1996 | Green et al. |
| 5,607,181 A | 3/1997 | Richardson et al. |
| 5,649,720 A | 7/1997 | Rink et al. |
| 5,669,629 A | 9/1997 | Rink |
| 5,782,486 A | 7/1998 | Barnes et al. |
| 5,803,493 A | 9/1998 | Paxton et al. |
| 5,820,162 A | 10/1998 | Fink |
| 5,826,904 A | 10/1998 | Ellis et al. |
| 5,882,036 A * | 3/1999 | Moore et al. ............... 280/736 |
| 6,010,153 A | 1/2000 | Halas et al. |
| 6,042,146 A * | 3/2000 | Bauer et al. ............... 280/737 |
| 6,244,622 B1 * | 6/2001 | Al-Amin et al. ............ 280/737 |
| 6,253,683 B1 * | 7/2001 | Fukabori .................... 102/530 |
| 6,332,404 B1 * | 12/2001 | Rink et al. .................. 102/530 |
| 6,431,595 B1 * | 8/2002 | Swann et al. ............... 280/736 |

FOREIGN PATENT DOCUMENTS

| | | |
|---|---|---|
| JP | 48-91611 A | 11/1973 |
| JP | 6-8788 A | 1/1994 |
| JP | 7-96814 A | 4/1995 |
| JP | 3031246 U | 9/1996 |
| JP | 9-506058 A | 6/1997 |
| JP | 9-175313 A | 7/1997 |
| JP | 3044475 U | 10/1997 |
| JP | 10-35401 A | 2/1998 |
| JP | 3048098 U | 2/1998 |
| JP | 10-230814 A | 9/1998 |
| JP | 10-250523 A | 9/1998 |
| JP | 10-590402 A | 9/1998 |
| JP | 10-291043 A | 11/1998 |

* cited by examiner

INFLATOR

This application is the national phase under 35 U.S.C. § 371 of PCT International Application No. PCT/JP01/07370 which has an International filing date of Aug. 28, 2001, which designated the United States of America.

BACKGROUND OF THE INVENTION

1. Field of the Invention

The present invention relates to an inflator which is mounted in various kinds of vehicles and that is suitable for an air bag to protect a passenger when the vehicle receives an impact. The present invention also relates to an inflator for protecting a passenger when the vehicle receives an impact from a lateral direction of the vehicle, and relates to a method of manufacturing the inflator.

2. Description of Related Art

An inflator for an air bag system for automobile uses, as means for inflating an air bag, a gas generating agent, a liquid fuel and a liquid gas such as a laughing gas. An inflator using carbon dioxide as an inflating means is disclosed in a Fundamentals of a Stored Liquefied Gas Inflator (Bart E. Adams and Mohamed E. Labib, 1999-01-1068). Such an inflator is demanded to function to inflate the air bag, and demanded to be reduced in size and in weight in view of the reducing weight of vehicle itself.

As an inflator for inflating type safety system of an automobile, in order to optimally protect a passenger in accordance with a position of a seat in a vehicle such as a driver side, a passenger side and the like, there are known various inflators such as an inflator for a driver side, an inflator for a passenger side next to the driver, an air bag inflator for a side collision, an inflator for a curtain air bag, an inflator for a knee-bolster air bag, an inflator for an inflatable seat belt, an inflator for a tubular system, and an inflator for pretensioner.

Among these inflators, the inflator for a curtain air bag inflates and develops the air bag instantaneously to make a curtain having a thickness of several centimeters over windows of a vehicle when the vehicle receives an impact in a lateral direction. The curtain air bag is for the sake of protecting a passenger from the impact applied from the lateral direction of the vehicle, and from an impact when the vehicle is rolls over. Therefore, it is necessary to shorten the period to the time when the air bag inflates as compared with a case in which the vehicle receives an impact from the front or the behind. Further, on account of the period of a roll over, the duration of the inflation has to be set to several seconds.

As described above, in the inflator for a curtain air bag, the period of time for the air bag to inflate has to be short and the duration of the inflation has to be long. Therefore, a method of inflating an air bag with a pressurized medium, not with a gas generating agent, is adopted. When a combustion gas of the gas generating agent is used, the air bag can be inflated instantaneously, however, because of a high temperature inside the inflated air bag, the air bag is cooled by a temperature difference with respect to the ambient temperature and is immediately deflated.

On the other hand, when only the pressurized medium is used, a temperature of the pressurized medium is lowered due to release of the temperature of the pressurized medium is lowered, and a temperature in the air bag is also lowered. Therefore, the air bag is heated by a temperature difference with respect to the ambient temperature, and the duration of the inflation can be held for several seconds. However, in case of inflating the air bag only by the pressurized medium, when an environmental temperature is low, there is an adverse possibility such that the inflation is delayed, and it has to be remedied to enhance the reliability as a product. Further, in order to reliably protect a passenger against an impact from the lateral direction of the vehicle, it is also demanded to inflate the air bag in shorter time. Such an inflator for a curtain air bag is mounted to, for example, on a pillar near a rear seat, and it is required to reduce the size as much as possible because a installing place is limited, and it is further required to reduce in weight as well as size in view of reducing the weight of the vehicle itself.

Not only the inflator for a curtain air bag, but also other various inflators are demanded to be small in size and weight from demands of reducing weight of the vehicle itself, and it is demanded to simplify the producing process from demands of reducing the number of parts and producing cost.

As related conventional technique, a device for inflating a flexible container using helium and hydrogen is disclosed in U.S. Pat. No. 5,527,066. A gas flow device for an air bag using a pressurized inert gas is disclosed in U.S. Pat. No. 5,782,486. An air bag apparatus for inflating an air bag by nitrogen or helium is disclosed in U.S. Pat. No. 3,680,886. A side inflator housing for an air bag using a pressurized gas and a gas generating agent is disclosed in U.S. Pat. No. 5,803,493. A pressurized gas inflator using argon or nitrogen as a pressurized gas is disclosed in JP-U No. 3031246.

SUMMARY OF THE INVENTION

The present invention provides an inflator that can further be reduced in size and weight. As means for accomplishing the above object, the invention provides an inflator comprising a housing in which a pressurized medium including carbon dioxide is charged, a combustion means for heating the pressurized medium, and ignition means for burning the combustion means.

In the present invention, the pressurized medium may be carbon dioxide alone, or a mixture of carbon dioxide and a different gas. If carbon dioxide and the different gas are used in combination as the pressurized medium, a content of the carbon dioxide in the pressurized medium is not less than 20 mol %, more preferably not less than 50 mol %, and more preferably not less than 80 mol %.

As such a different gas, an inert gases such as helium, argon and neon, or nitrogen gas, nitrous oxide gas (laughing gas) or the like may be used. On account of the combustion efficiency of the combustion means, oxygen may be included in the pressurized medium. An amount of oxygen is determined in accordance with a kind of the combustion means, and 1 mol % or greater and 25 mol % or less at the maximum in the pressurized medium is preferable. Further, it is preferable that about 1 to 10 mol % of helium is included in the pressurized medium so that gas leakage can be effectively detected.

Preferably, the charging pressure is set to not less than 4 MPa. The upper limit value varies depending upon a composition of the pressurized medium, but the upper limit value can be set to 200 MPa at the maximum.

When 90% liquid carbon dioxide is charged, the charging density of carbon dioxide is 23,400 mol/m$^3$. In the case of argon, the charging density is 12,000 mol/m$^3$ when charging pressure is 30 MPa. In the case of helium, the charging density is 16,400 mol/m$^3$ when the charging pressure is 50 MPa. Therefore, when carbon dioxide is charged, the volume can be reduced to about 51% as compared with a case in which 30 MPa of argon is charged, and the volume can be reduced to 70% as compared with a case in which 50 MPa of helium is charged. Thus, a length or a diameter of the inflator housing can be reduced to enhance the charging pressure. Therefore, the inflator can be reduced in size and weight as a whole.

The combustion means used in the present invention is not for inflating the air bag by the combustion gas, but for promoting the inflation of the air bag by heating the pressurized medium. Thus, the combustion means is not particularly limited as long as the combustion means exhibits the above function, and a priming mainly comprising nitrate (boron niter or the like), a priming mainly comprising perchlorate, a smokeless priming or the like can be used.

The inflator of the present invention can be reduced in size and weight, and can inflate the air bag instantaneously and unfailingly without being affected by variation in the ambient temperature.

The present invention also provides an inflator which is improved in operation performance, and is not affected by the environmental temperature, and in which an inflating speed and an inflation time can be suitably maintained because the period to the time when the maximum pressure is obtained is short and the duration of the maximum pressure is long.

The inflator of the present invention can be applied to any one of an inflator for a curtain air bag, and a side inflator against a side collision. The following description is based on a case in which the invention is applied to the inflator for a curtain air bag.

As means for solving the above object, the present invention provides an inflator comprising an inflator housing in which a pressurized medium is charged and an opening is provided at one end, and a diffuser portion which is fixed on the opening side of the inflator housing and is provided with a gas discharging port for discharging the pressurized medium flowing from the opening at actuation, wherein an outflow path for the pressurized medium between the diffuser portion and the opening of the inflator housing is closed with a rupturable plate, and rupturing means for the rupturable plate is arranged, and one, two or three requirements selected from the following requirements (a), (b), and (c) are provided:

Requirement (a): the pressurized medium filled in the inflator housing has a sound velocity of not less than 400 m/sec at 0° C. at 1013.25 hPa.

Since a vehicle is used in a wide temperature range such as in the summer to the winter, essentially, inflators have to be actuated unfailingly in a wide temperature range. If a sound velocity of the pressurized medium is small, the discharging speed of the pressurized medium becomes small at a temperature lower than the normal temperature, and the inflation of a curtain air bag may be delayed. By meeting the requirement (a), it is possible to instantaneously and unfailingly inflate the curtain air bag, but to obtain the inflation time of a few seconds, and further, an inflation time of the air bag can be shortened, regardless of an ambient temperature.

The sound velocity of the pressurized medium at 0° C. at 1013.25 hPa (1 atm) is preferably not less than 700 m/sec, and more preferably, not less than 900 m/sec.

The pressurized medium is not particularly limited as long as a sound velocity thereof at 0° C. under pressure of 1013.25 hPa is not less than 400 m/sec, but in view of safety, one or a mixture of at least two selected from only inert gases such as helium (970 m/sec), neon (435 m/sec), argon (319 m/sec) and nitrogen gas (337 m/sec) is preferable. Helium and/or neon is more preferable, and additionally, for example, a mixed gas in which nitrogen gas and/or carbon dioxide is added to helium may be used. The charging pressure at 20° C. of the pressurized medium can be about 35,000 kPa at the maximum pressure In case that the pressurized medium comprises only argon, the inside of the inflator housing is cooled as the pressure is abruptly released, and, there is a problem such that rising time of pressure is prolonged. To solve this problem, it is necessary to burn the combustion means such as a priming to increase the internal pressure. However, the requirement (a) can eliminate the need of combustion means for heating the pressurized medium.

Requirement (b): a charging pressure at 20° C. of the pressurized medium in the inflator housing is 40,000 kPa.

In the case of a conventional inflator, the charging pressure of the pressurized medium is 35,000 kPa at the maximum. But when the charging pressure is increased to not less than 40,000 kPa by shortening the longitudinal size, the inflator housing can be reduced in size and weight. The charging pressure of the pressurized medium is preferably not less than 50,000 kPa, and the upper limit value can be set to 200,000 kPa at the maximum.

(c): the total area ($A_1$) of gas charging port and the area ($A_2$) of the opening is set to meet $A_1/A_2 \leq 1$.

By setting the requirement (c) to $A_1/A_2 \leq 1$, the discharging pressure of the pressurized medium at the time of actuation is controlled to an appropriate pressure. If $A_1/A_2$ exceeds 1, the inflating speed is determined only by $A_2$ and thus, the inflating speed can not be adjusted easily. However, if it is unnecessary to adjust the inflating speed, $A_1/A_2$ may exceed 1. Preferably, the requirement (c) is $A_1/A_2<1$, more preferably $A_1/A_2 \leq 0.95$, and still more preferably $A_1/A_2 \leq 0.85$. The lower limit value of $A_1/A_2$ can be 0.015 at the minimum. In this case, it is preferable that $A_2$ is as great as possible so that the pressurized medium is discharged more smoothly, and it is preferable that the maximum $A_2$ is about the same as the cross sectional area of the inflator housing in the widthwise direction.

As means for solving the above problem, the present invention provides an inflator comprising an inflator housing in which a pressurized medium is charged and an opening is provided at one end, and a diffuser portion which is fixed on the opening side of the inflator housing and is provided with a gas discharging port for discharging the pressurized medium flowing from the opening at actuation of the inflator, wherein an outflow path for the pressurized medium between the diffuser portion and the opening of the inflator housing is closed with a rupturable plate, and the inflator further comprises rupturing means for the rupturable plate, the gas discharging port is open, and the inside of the diffuser portion is under the normal pressure.

In this invention, it is also preferable that the inflator has one, two or three requirement selected from the above-described requirements (a), (b), and (c).

The above inventions may have a structure such that the rupturing means for the rupturable plate is provided in the diffuser portion, or alternatively, a structure such that the rupturable plate, the rupturing means, and the diffuser portion are disposed in the vicinity of the opposite ends in the longitudinal direction of the inflator housing.

The above inventions may have a structure such that the diffuser portion has a filter and the pressurized medium is discharged from the gas discharging port via the filter.

In the inflator, no gas generating agent is burned so that no high temperature combustion gas is generated. However, when an igniter includes a priming as rupturing means for rupturing the rupturable plate, the above-described filter can prevent combustion residue from being discharged from the gas discharging port, and also prevent debris of the rupturable plate from being discharged from the gas discharging port.

In the inventions, an inflator housing in which one end of a pipe is closed and the diffuser portion is connected to the other end can be used.

By making the inflator housing from a pipe, no junction in the longitudinal direction is caused as compared with an inflator housing made from a plate so that the pressure resistance and durability can be improved.

In each of the above inventions, the rupturable plate is mounted to the opening side of the inflator housing or the diffuser portion side.

The inflator of the present invention can instantaneously and unfailingly inflate the air bag without being affected by variation in the ambient temperature. Further, the time period to reach the maximum pressure can be shortened, and the duration of the maximum pressure can be elongated. Further, the discharging speed of the pressurized medium can be adjusted.

The present invention also provides an inflator capable of simplifying the producing steps, enhancing the pressure resistance and durability of the product, and reducing the size and weight of the inflator, and to provide a producing method thereof.

The present invention can be used as an inflator for a curtain air bag or a side inflator for a side collision, but the following description is based on a case in which the invention is used as an inflator for a curtain air bag.

The present invention provides an inflator comprising an inflator housing in which a pressurized medium is charged and an opening is provided at one end, and a diffuser portion which is fixed to the opening side of the inflator housing and is provided with a gas discharging port for discharging the pressurized medium flowing from the opening upon actuation of the inflator, wherein an outflow path for the pressurized medium between the diffuser portion and the opening of the inflator housing is closed with a rupturable plate, and rupturing means for the rupturable plate is provided in the diffuser portion, wherein one end of a pipe of the inflator housing is closed, and the diffuser portion is connected to the other end of the inflator housing.

By making the inflator housing from a pipe, no junction in the longitudinal direction is caused as compared with an inflator housing made of one plate so that the pressure resistance and durability can be improved.

For manufacturing the inflator housing, a pipe which has a uniform diameter over the entire length in the longitudinal direction is preferable. Further preferably, the inflator housing is obtained by forming the pipe in accordance with a swaging method or a spinning method, and the pressurized medium is charged from the closed end side of the inflator housing.

In each of the above inventions, the rupturable plate is mounted to the opening side of the inflator housing or the diffuser portion side.

Further, the present invention provides a method of manufacturing the above-described inflator comprising the steps such that a small hole is left at the time of closing one end of the pipe, the pressurized medium is charged from the small hole, and then the small hole is closed.

In case of using one plate, a step of bending the plate material, a step of welding the junction, and a step of closing the opening are required in manufacturing the inflator housing. However, in case of using a pipe, only a step of closing the opening is required so that the producing process can be simplified and the producing cost can be reduced. Further, the number of welding points is reduced, and a possibility of the pressurized medium from leaking becomes less.

In the above manufacturing method, it is preferable that the pipe is processed in accordance with a swaging method or a spinning method, a seal pin is fitted into the small hole, the pressurized medium is charged, and then the seal pin is welded and closed.

The "swaging method" is one kind of forging such that a material is compressed in the longitudinal direction and the perpendicular direction to be molded. The "spinning method" is a method, called a pallet-spinning method, in which a metal plate or preformed metal plate is rotated at a high speed, spinning or forming roller is pushed against this to form a hollow product having a circular cross section.

The inflator of the present invention can be reduced in size and weight without deteriorating the pressure resistance and durability. Further, the manufacturing method according to the present invention is applied, the producing process is simplified, and the producing cost can be reduced.

The inflator of the present invention can be used for various inflators such as an inflator for a driver side, an inflator for a passenger side next to the driver, an inflator for a side air bag, an inflator for a curtain air bag, an inflator for a knee-bolster air bag, an inflator for an inflatable seat belt, an inflator for a tubular system, and an inflator for a pretensioner.

The inflator of the present invention can be used for an inflator for a curtain air bag. The inflator for a curtain air bag is mounted to an air bag which is developed in a form of a curtain. When a vehicle rolls over, the curtain air bag prevents a passenger from being thrown out from a vehicle window by forming a wall like a curtain. The inflator of the invention can be mounted to an air bag for protecting the passenger from a side collision.

DETAILED DESCRIPTION OF THE INVENTION

First Embodiment

Figure 1:
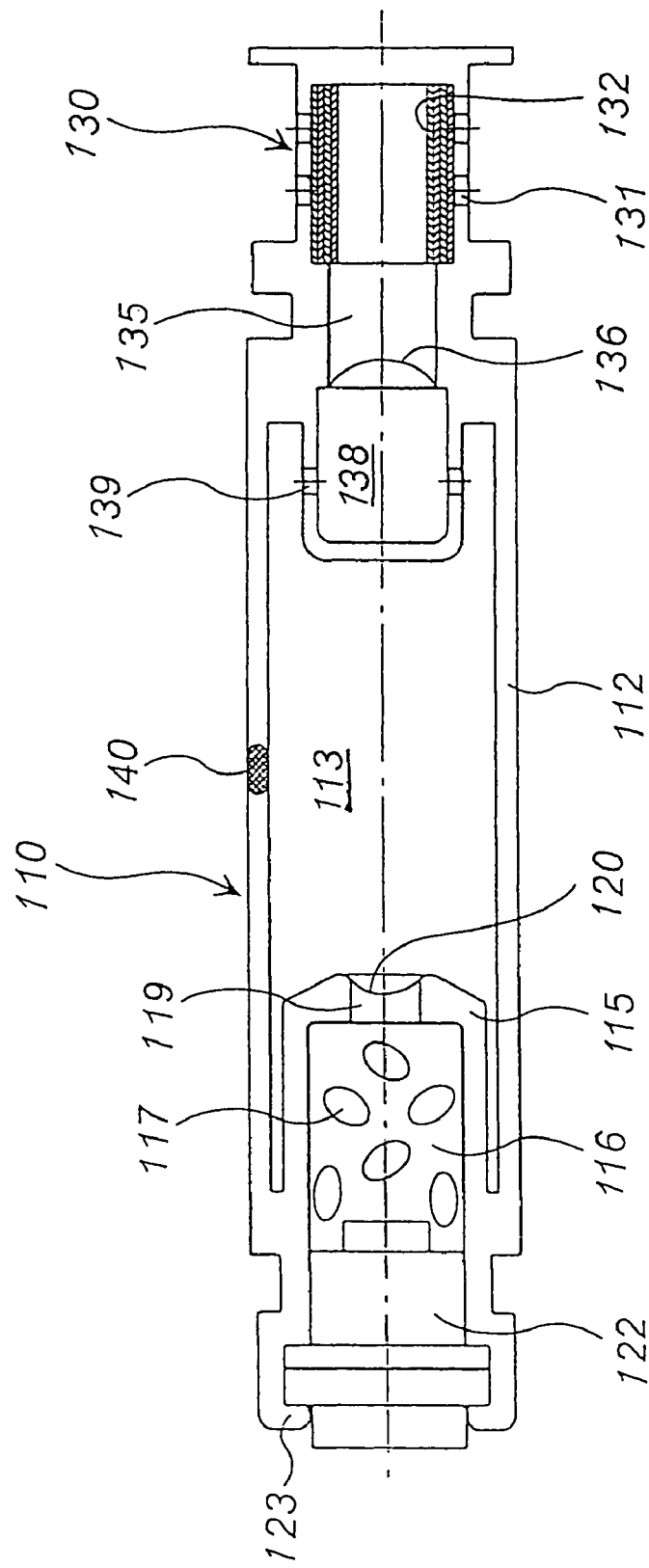
FIG. 1 is a cross-sectional view of an inflator of the present invention in the longitudinal direction.

An embodiment of the invention will be explained based on the drawings. FIG. 1 is a cross-sectional view of an inflator 110 of the present invention in the longitudinal direction.

An inflator housing 112 is a cylindrical pressure-resistant container. Carbon dioxide (liquid) as pressurized medium is charged into the inner space 113 under the charging pressure of not less than 4 MPa. The carbon dioxide is charged from a small hole provided in a side surface of the inflator housing 112, and the small hole is closed by welding as shown with 140 in the drawing.

The one end of the inflator housing 112 is provided with a combustion chamber housing 115 which is integrally formed with the inflator housing 112 to project into the inner space 113. A combustion chamber 116 in which combustion means 117 is filled is provided in the combustion chamber housing 115. A kind and amount of the combustion means 117 is not limited as long as a combustion gas thereof can heat the pressurized medium, and, for example, several grams of gun powder such as boron niter can be used, or additionally, a liquid fuel, a gas fuel or a combination of a liquid fuel or a gas fuel and an oxidizer can be used.

A combustion gas passage 119 extending from the combustion chamber 116 to the inner space 113 is provided with a first rupturable plate 120. Since the combustion gas passage 119 is completely blocked partway, the combustion chamber 116 is maintained at the normal ambient atmosphere.

An igniter 122 as ignition means is provided in contact with the combustion chamber 116. The igniter 122 is fixed by crimping an end 123 of the inflator housing 112. One end of the inflator housing 112 is closed by the igniter 122.

The other end of the inflator housing 112 is provided with a diffuser portion 130. The side surface of the diffuser portion 130 has the required number of gas discharging ports 131 for discharging a mixed gas comprising the pressurized medium and a combustion gas to the outside, and a filter 132 made of wire mesh provided to cover the gas discharging ports 131 from the inside. The mixed gas is discharged outside always through the filter 132 from the gas discharging ports 131.

A mixed gas passage 135 extending from the diffuser portion 130 to the inner space 113 is provided with a second rupturable plate 136. Since the mixed gas passage 135 is completely blocked, the diffuser portion 130 is also maintained at the normal pressure.

A mixed-gas flowing-in chamber 138 is provided between the second rupturable plate 136 and the inner space 113. The mixed-gas flowing-in chamber 138 is formed integrally with the inflator housing 112 and projects toward the inner space 113. The required number of communication holes 139 are provided in a side surface of the mixed-gas flowing-in chamber 138.

Next, the operation of the inflator 110 will be explained. When mounted to a vehicle, the inflator 110 is incorporated into a system including activation signal-outputting means which comprises an impact sensor and a control unit, and a module case accommodating the inflator 110 and an air bag. Upon receiving a signal from the impact sensor in the above system at the time when the vehicle receives an impact, the igniter 122 is activated, the combustion means 117 is ignited and burned to generate a high temperature combustion gas, and ruptures the first rupturable plate 120.

Then, the high temperature combustion gas flows into the inner space 113. Since the pressurized medium (carbon dioxide) is heated and expands to increase the internal pressure, the mixed gas flows into a mixed-gas flowing-in chamber 138 through a communication hole 139 to increase the pressure, and ruptures a second rupturable plate 136. After the mixed gas flows through a mixed gas passage 135 and a filter 132, the gas is discharged from the gas discharging port 131 to inflate the air bag.

Second Embodiment

Figure 3:
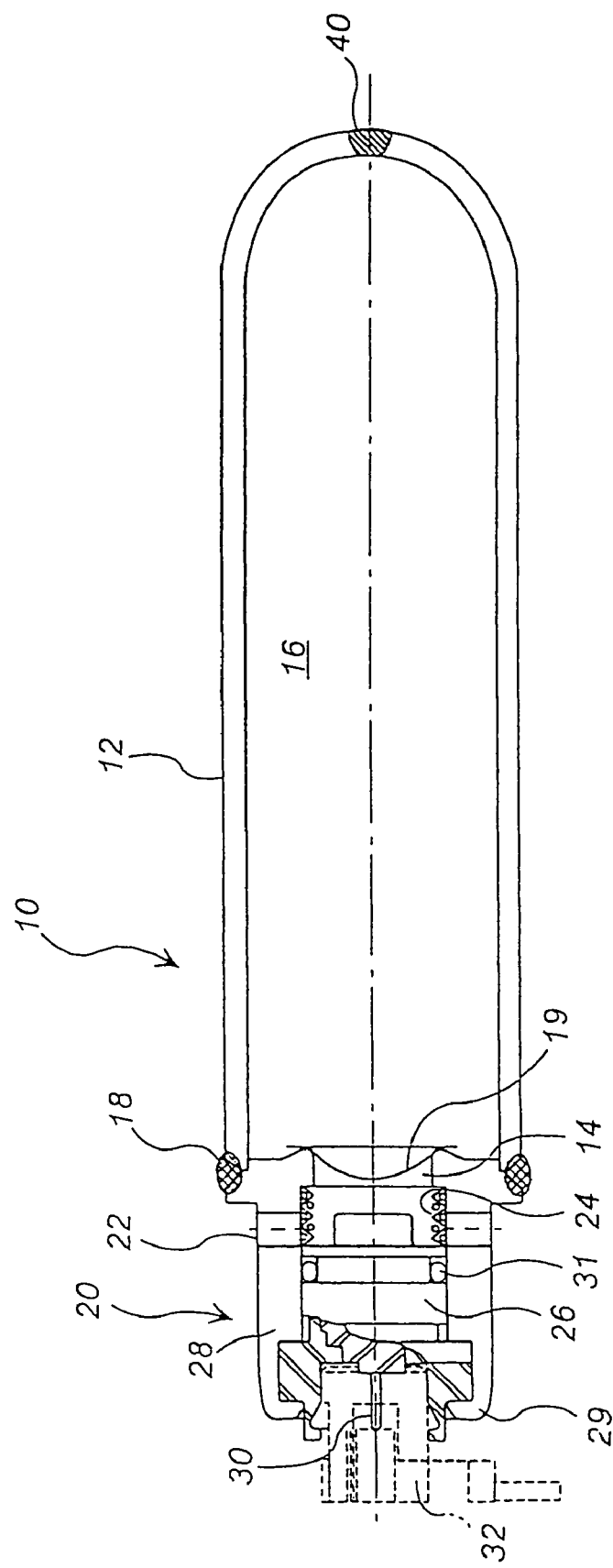
FIG. 3 is a cross-sectional view of an inflator of the present invention in the longitudinal direction.

Another embodiment of the present invention will be explained based on the drawing. FIG. 3 is a cross-sectional view of an inflator 10 for a curtain air bag of the present invention in the longitudinal direction.

First, a first version of the second embodiment according to the present invention will be explained. One end of an inflator housing 12 has an opening 14, and the other end of the inflator housing 12 is closed. The inner space 16 is filled with a pressurized medium comprising only an inert gas having a sound velocity of not less than 400 m/sec at 0° C. at 1013.25 hPa. The pressurized medium is charged from a small hole formed at an end of the inflator housing 12. A seal pin is fitted into the small hole and then, the small hole is closed by welding. The numeral 40 indicates a state in which the small hole is closed by welding. A cross section of the inflator housing 12 in the widthwise direction is circular in shape, and the opening 14 is also circular in shape.

A diffuser portion 20 is fixed to the inflator housing 12 in the opening 14 side at the connecting portion 18 by welding. An outer shell of the diffuser portion 20 is formed with a diffuser housing 28. The diffuser portion 20 has gas discharging ports 22 for discharging the pressurized medium flowing from the opening 14 at actuation, and a filter 24 made of wire mesh provided to cover a gas discharging ports 22 from the inside. Thus, the pressurized medium is discharged from the gas discharging ports 22 always through the filter 24.

The total area ($A_1$) of the gas discharging ports 22 and the area ($A_2$) of the opening 14 of the inflator housing 12 are set to $A_1/A_2 \leq 1$, preferably $A_1/A_2 \leq 1$, more preferably $A_1/A_2 \leq 0.95$, and still more preferably $A_1/A_2 \leq 0.85$. It is preferable that the lowest value of $A_1/A_2$ is 0.015.

The opening 14 of the inflator housing 12 is closed with a rupturable plate 19 provided at the diffuser portion 20. Before actuation, the inner space 16 of the inflator housing 12 is maintained in a high pressure airtight state, and the diffuser portion 20 is under the normal pressure. Such an inflator housing 12 can be formed in accordance with a swaging method by using a pipe with a uniform diameter.

The diffuser portion 20 is provided with an igniter 26 having a priming as rupturing means for rupturing the rupturable plate 19. The igniter 26 is fitted into a diffuser housing 28 and mounted to the diffuser portion 20, and is fixed by crimping an end 29 of the diffuser housing 28. Reference numeral 30 represents a conductive pin to electrify the igniter 26, reference numeral 31 represents an O-ring, reference numeral 32 shown with a broken line represents a connector to be connected to a power supply when the inflator is mounted to the vehicle.

Next, the operation when the inflator 10 for a curtain air bag is actuated will be explained. When mounted to the vehicle, the inflator 10 for a curtain air bag is incorporated into a system including activation signal-outputting means which comprises an impact sensor and a control unit, and a module case accommodating the inflator 10 for a curtain air bag and a curtain air bag. Upon receiving a signal from the impact sensor in the above system at the time when the vehicle receives an impact, the igniter 26 is activated, the priming is ignited and burned to rupture the first rupturable plate 19.

The opening 14 is opened due to rupture of the rupturable plate 19, and the pressurized medium in the inner space 16 is discharged from the gas discharging port 22 via the filter 24 to inflate the curtain air bag. At that time, the discharging pressure of the pressurized medium is controlled by the gas discharging port 22, and the filter 24 prevents combustion residue of the priming and fragments of the rupturable plate 19 from being ejected into the curtain air bag.

The pressurized medium has a sound velocity of 400 m/sec, and therefore, it is possible to inflate and develop the air bag in 10 to 20 msec without being affected by variation in a temperature inside the vehicle. Then, the pressurized medium in a high pressure state is released at a time, and the temperature inside the inflated air bag becomes lower but warm by the difference from the ambient temperature, and thereby the inflation of the air bag is maintained for a few seconds.

Next, a second version of the second embodiment according to the present invention will be explained. The structure of the inflator 10 for a curtain air bag in the second version is substantially the same as that of the first version, and only structures different from the first version will be explained.

The inner space 16 of an inflator housing 12 is filled with a pressurized medium comprising an inert gas under the pressure of not less than 40,000 kPa, and the highest value can be set to 200,000 kPa at the maximum. In this embodiment, in order to increase the charging pressure, a diameter of the inflator housing is uniform, and a length thereof is shortened by about 70% as compared with a case in which the charging pressure is 35,000 kPa.

The operation of the inflator 10 for a curtain air bag of the second embodiment is the same as that of the first embodiment.

When the inflator of the present invention is used as a side inflator, the air bag is connected directly to a portion of the gas discharging port 22 or through an appropriate adapter.

Third Embodiment

Another embodiment of the present invention will be explained based on the drawing. FIG. 3 is a sectional view of an inflator 10 for a curtain air bag of the present invention in the longitudinal direction.

One end of an inflator housing 12 has an opening 14, and the other end thereof is closed. The inner space 16 is filled with a pressurized medium comprising an inert gas under the maximum pressure of 35,000 kPa. A cross section of the inflator housing 12 in the widthwise direction is circular in shape, and the opening 14 is also circular in shape.

The inflator housing 12 is substantially closed at one end thereof, except for a small hole provided at the end, by the swaging method or the spinning method. The small hole is a charging hole for the pressurized medium. After the diffuser portion 20 is connected to the inflator housing 12, the pressurized medium is charged from the small hole. Then, the small hole is plugged with a seal pin having substantially the same diameter as the small hole. The inflator housing 12 is welded at the portion of the seal pin to completely be closed. The numeral 40 indicates a state in which the thin hole is closed by welding.

The constituent elements of the third embodiment are the same as those in the second embodiment.

The inflator for a curtain air bag may have one or two or three requirements selected from the following requirements (a), (b), and (c).

Requirement (a): the pressurized medium filled in the inflator housing has a sound velocity of not less than 400 m/sec at 0° C. at 1013.25 hPa;

Requirement (b): a charging pressure at 20° C. of the pressurized medium in the inflator housing is not less than 40,000 kPa; and Requirement (c): the total area ($A_1$) of the gas discharging port(s) and the area ($A_2$) of the opening is set to meet $A_1/A_2 \leq 1$.

Since a vehicle is used in a wide temperature range such as in the summer to the winter, essentially, the respective kinds of inflator has to be actuated unfailingly in a wide temperature range. If a sound velocity of the pressurized medium is small, the discharging speed of the pressurized medium becomes small at a temperature lower than the normal temperature, and the inflation of a curtain air bag may be delayed. By meeting the requirement (a), it is possible to instantaneously and unfailingly inflate the curtain air bag, but to obtain the inflation time of a few seconds, and further, an inflation time of the air bag can be shortened, regardless of an ambient temperature.

The sound velocity of the pressurized medium meeting the requirement (a) at 0° C. at 1013.25 hPa (1 atm) is preferably not less than 700 m/sec, and more preferably, not less than 900 m/sec.

The pressurized medium meeting the requirement (a) is not particularly limited as long as a sound velocity thereof at 0° C. under pressure of 1013.25 hPa is not less than 400 m/sec, but in view of safety, one or a mixture of at least two selected from only inert gases such as from helium (970 m/sec), neon (435 m/sec), argon (319 m/sec) and nitrogen gas (337 m/sec) is preferable. Helium and/or neon is more preferable, and additionally, for example, a mixed gas in which nitrogen gas and/or carbon dioxide is added to helium may be used. The charging pressure at 20° C. of the pressurized medium can be about 35,000 kPa at the maximum pressure.

In the case of a conventional inflator for a curtain air bag, the charging pressure of the pressurized medium is 35,000 kPa at the maximum, but if the charging pressure is increased to 40,000 kPa or higher to meet the requirement (b) by shortening the longitudinal size, the inflator housing can be reduced in size and weight. The charging pressure of the pressurized medium is preferably not less than 50,000 kPa.

By setting the requirement (c) to $A_1/A_2 \leq 1$, the discharging pressure of the pressurized medium at the time of actuation is controlled to an appropriate pressure. If $A_1/A_2$ exceeds 1, the inflating speed is determined only by $A_2$ and thus, the inflating speed can not be adjusted easily. However, if it is unnecessary to adjust the inflating speed, $A_1/A_2$ may exceed 1. Preferably, the requirement (c) is $A_1/A_2 < 1$, more preferably $A_1/A_2 \leq 0.95$, and still more preferably $A_1/A_2 \leq 0.85$. In this case, it is preferable that $A_2$ is as large as possible so that the pressurized medium is discharged more smoothly, and it is preferable that the maximum $A_2$ is about the same as the cross sectional area of the inflator housing in the widthwise direction.

EXAMPLES

The present invention will be explained more specifically by referring examples. However, the present invention is not limited thereto.

Example 1

Figure 2:
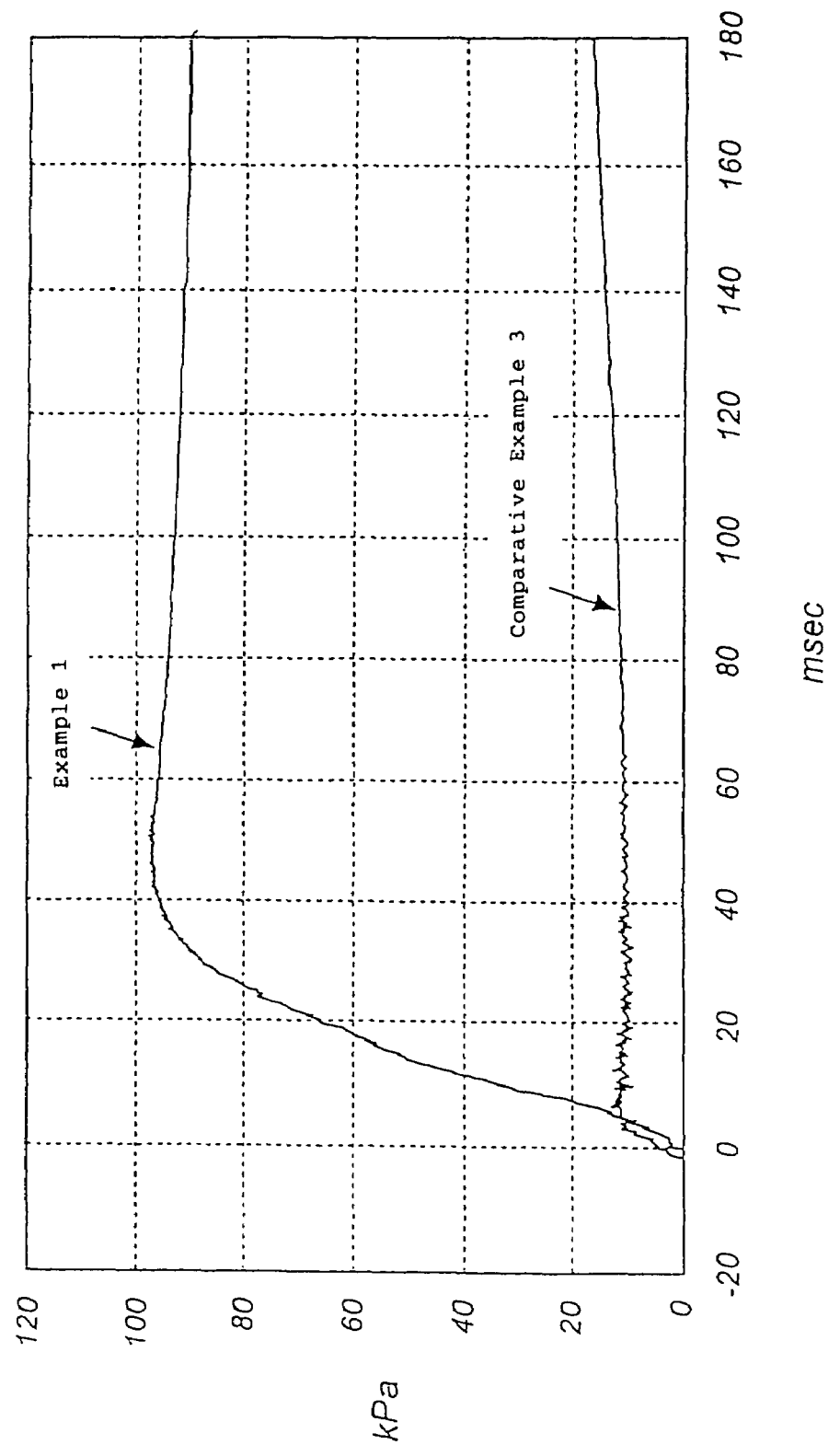
FIG. 2 is a graph showing pressure change with time in a 60 Liter tank internal pressure test carried out in Embodiment 1 and Comparative Example 3.

An inflator having the structure shown in FIG. 1 was made. As the pressurized medium, carbon dioxide (liquid) was charged under the charging pressure of 6 MPa (the charging density of 23,400 mol/m$^3$; 38 g). 4.5 g of boron niter was used as combustion means. The inflator had a maximum diameter of 30 mm, a length of 150 mm, and a total weight was 300 g. 60 L tank test was conducted with this inflator and a pressure curve was measured. A result thereof is shown in FIG. 2.

Comparative Example 1

Using argon instead of carbon dioxide, an inflator having the same structure as that of Example 1 was made under the charging pressure of 30 MPa (the charging density of 12,000 mol/m$^3$; 41 g). The inflator has a maximum diameter of 30 mm, a length of 250 mm, and a total weight was 400 g.

Comparative Example 2

Using helium instead of carbon dioxide, an inflator having no combustion means was made under the charging pressure of 50 MPa (the charging density of 16,400 mol/m$^3$; 4.1 g). The inflator has a maximum diameter of 30 mm, a length of 200 mm, and a total weight was 280 g.

Comparative Example 3

Using carbon dioxide as the pressurized medium, an inflator having no combustion means was made. The charging pressure was 6 MPa (the charging density of 23,400 mol/m$^3$; 45 g). The inflator has a maximum diameter of 30 mm, a length of 140 mm, and a total weight was 280 g. The 60 L tank test with the inflator, was conducted and the pressure curve was measured. A result thereof is shown in FIG. 2.

As apparent in FIG. 2, with respect to the inflator of Example 1, the period to the time when the pressure reached the maximum pressure was appropriate, and the duration of the maximum pressure was long. On the other hand, in the case of inflator of Comparative Example 3, the inflator was lighter in weight than that of the first embodiment because the combustion means was not included, but pressure hardly rose. This is because the inside of the inflator housing is cooled as the pressure was rapidly released.

Example 2

Using the inflator shown in FIG. 3, helium (the sound velocity of 970 m/sec) was charged as the pressurized medium under the charging pressure of 50,000 kPa. The inflator was incorporated into a normally used air bag system (the maximum inflation volume of the air bag was 25 L), and the inflator was actuated in the atmosphere of 20° C. The air bag was inflated to the maximum level in about 10 msec, and the maximum inflated state was maintained for about 10 seconds.

Comparative Example 4

Under the same condition of Example 2 except that argon (319 m/sec) was used instead of helium, the inflator was actuated in the atmosphere of 20° C., the air bag was inflated to the maximum level in about 80 msec, and the maximum inflated state was maintained for about 10 seconds.

Examples 3 and 4, Comparative Examples 5 and 6

A tank internal pressure test was conducted with the inflator shown in FIG. 3, using a 60 Liter tank at 23° C. while setting the pressurized medium and the charging pressure to the following values. A volume of the inflator housing was 104.5 ml(the diameter 30× the length 232 mm)in Example 3, 142.2 ml(the diameter 30× the length 294 mm)in Example 4, 104.5 ml(the diameter 30× the length 232 mm)in Comparative Example 4, and 142.2 ml(the diameter 30× the length 294 mm)in Comparative Example 5. Variation with time in the obtained pressure curves are shown in FIG. 2.

|  | Pressurized medium | Charging pressure (kPa) |
|---|---|---|
| Example 3 | Helium 100% | 50,000 |
| Example 4 | Helium 100% | 32,000 |
| Comparative Example 5 | Argon 96%, The balance: helium | 50,000 |
| Comparative Example 6 | Argon 96%, The balance: helium | 32,000 |

Figure 4:
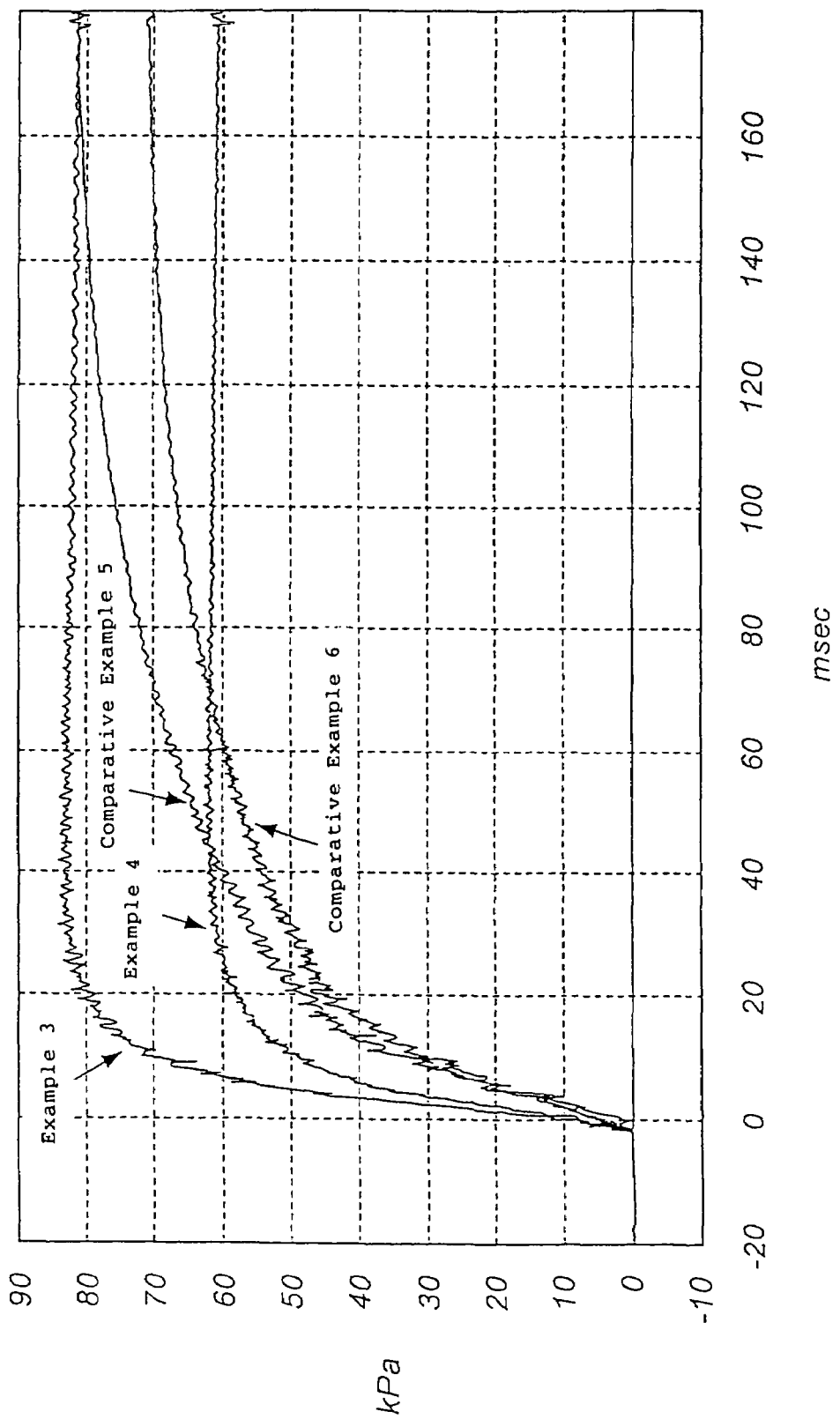
FIG. 4 is a graph view showing pressure change with time in the 60 Liter tank internal pressure test carried out in Embodiments 3 and 4 and Comparative Examples 5 and 6.

As apparent in FIG. 4, the period of time for the pressure to reach the maximum pressure in Examples 3 and 4 was shortened as compared with Comparative Examples 5 and 6.

Examples 5 and 6, and Comparative Example 7

Helium was charged into the inflator shown in FIG. 3 under charging pressure of 50,000 kPa while adjusting the $A_1/A_2$ to the following values. A tank internal pressure test was conducted with the inflators, using the 60 Liter tank at 23° C. Variation with time in the obtained pressure curves are shown in FIG. 5.

| Example 5: | $A_1/A_2$ = 33 mm$^2$/33 mm$^2$ = 1.0 |
| Example 6: | $A_1/A_2$ = 15.7 mm$^2$/33 mm$^2$ = 0.47 |
| Comparative Example 7: | $A_1/A_2$ = 63.5 mm$^2$/33 mm$^2$ = 1.9 |

Figure 5:
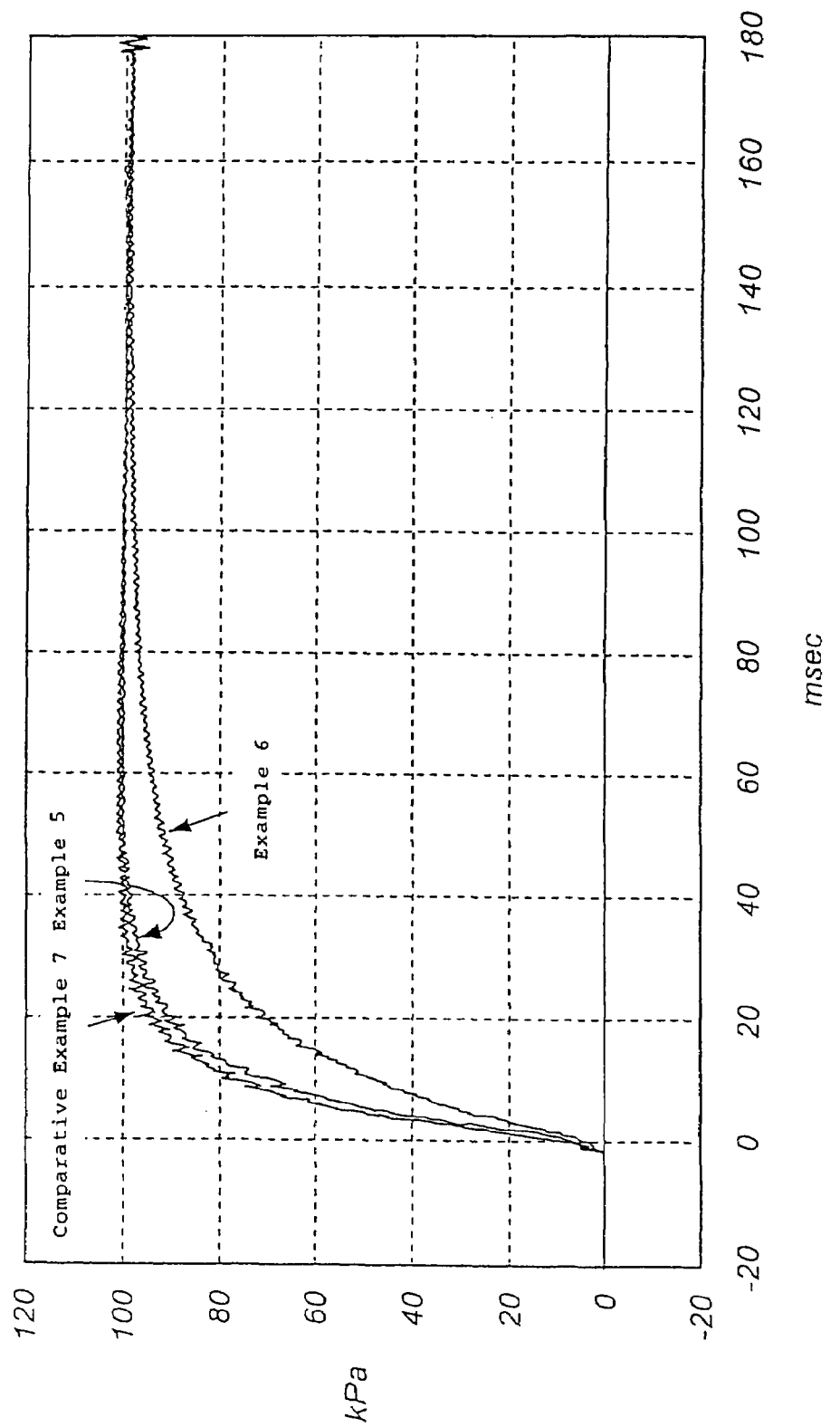
FIG. 5 is a graph showing pressure change with time in the 60 Liter tank internal pressure test carried out in Embodiments 5 and 6 and Comparative Example 7.

As apparent in FIG. 5, in Examples 5 and 6, the discharging speed of the pressurized medium could be changed by changing the area of the $A_1$ to adjust the $A_1/A_2$ to not more than 1. On the other hand, in Comparative Example 5, since the $A_1/A_2$ exceeded 1, the discharging speed of the pressurized medium did not rise even through the area of $A_1$ was increased.

Example 7

The inflator 10 shown in FIG. 3 was made. The inflator housing 12 is obtained by forming the pipe in accordance with a swaging method.

| Material of pipe: | carbon steel pipe |
| Length of pipe: | about 150 mm |
| Outer diameter of pipe: | 30 mm |
| Thickness of pipe: | 2 mm |

Figures 6A, 6B, 6C:
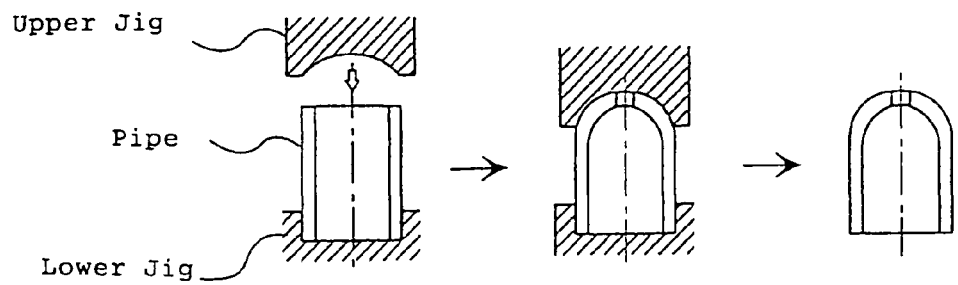
FIGS. 6(a)–6(c) are views for explaining a swaging working.

Details of the swaging method are as shown in FIGS. 6(a)–6(c). First, as shown in FIG. 6(a), the pipe was fitted into a lower jig and fixed therein. Next, as shown in FIG. 6(b), the swaging working was conducted for pressing the pipe with an upper jig. Then, as shown in FIG. 6(c), the inflator housing 12 which was substantially closed except for the small hole was obtained.

The diffuser portion 20 was welded and connected to the inflator housing 12 obtained in the above-described manner and then, a wire mesh filter 24 was disposed, the igniter 26 was fitted therein, the connector 32 was connected, thereby obtaining the inflator 10.

Helium was charged so that the internal pressure was 62 kPa in the inflator housing 10. $A_1/A_2$ was set to be equal to 0.20.

Example 8

The inflator 10 was obtained in the same manner as that of Example 7 except that the pipe was subjected to the spinning working. Details of the spinning working are as shown in FIG. 7.

Figures 7A, 7B, 7C:
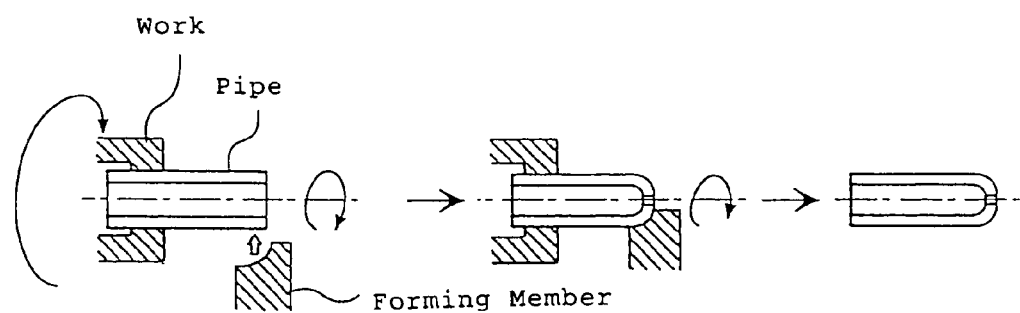
FIGS. 7(a)–7(c) are views for explaining a spinning work.

As shown in FIG. 7(a), the pipe was fixed to a work. Then, the pipe was pushed against a forming member (pallet) as shown in FIG. 7(b) while rotating the pipe in the direction of the arrow, thereby conducting the spinning working, and the inflator housing 12 which was substantially closed except for the small hole was obtained as shown in FIG. 7(c).

The invention claimed is:

1. An inflator, comprising:
   an inflator housing accommodating a pressurized medium and defining an opening;
   a diffuser portion that covers the opening and is provided with at least one gas discharging port, formed in a peripheral wall of the diffuser portion, for discharging the pressurized medium upon actuation of the inflator, such that pressure inside the diffuser portion is at an atmospheric pressure prior to an activation of the inflator; the diffuser portion defining therein a flow-path that allows the pressurized medium to flow from the inflator housing to the at least one gas discharging port;
   a rupturable plate that seals the flow-path, a peripheral portion of the rupturable plate being attached to the diffuser portion and an entire remaining portion of the rupturable plate being apart from any of elements of the inflator;
   rupturing means, that directly opposes the rupturable plate, for rupturing the rupturable plate; and
   a filter that covers the at least one gas discharging port, such that the pressurized medium is discharged from the at least one gas discharging port through the filter,
   wherein, at least one selected among the following requirements (a), (b), and (c) is provided,
   (a): the pressurized medium filled in the inflator housing has a sound velocity of not less than 400 m/sec at 0° C. at 1013.25 hPa,
   (b): a charging pressure at 20° C. of the pressurized medium in the inflator housing is not less than 40,000 kPa, and
   (c): the total area ($A_1$) of the gas discharging port(s) and the area ($A_2$) of the opening is set to meet $A_1/A_2 \leq 1$,
   wherein the pressurized medium is discharged through the diffuser portion without being heated.

2. The inflator according to claim 1, wherein the pressurized medium meeting said requirement (a) has a sound velocity of not less than 900 m/sec at 0° C. at 1013.25 hPa.

3. The inflator according to claim 1, wherein the pressurized medium meeting said requirement (a) is one or a mixture of at least two selected only from an inert gas.

4. The inflator according to claim 1, wherein the pressurized medium meeting said requirement (a) is one of helium and neon.

5. The inflator according to claim 1, wherein $A_1/A_2$ in said requirement (c) is 0.95 or less.

6. The inflator, according to claim 1, wherein the inflator housing has no seam in a longitudinal direction thereof.

7. An inflator, comprising:
   an inflator housing accommodating a pressurized medium;
   a diffuser portion attached to an opening of the inflator housing and provided with at least one gas discharging port, formed in a peripheral wall of the diffuser portion, for discharging the pressurized medium upon actuation of the inflator, the diffuser portion defining, therein, a flow path that allows the pressurized medium to flow from the inflator housing to the at least one gas discharging port and a space in constant fluid communication with an outside of the diffuser portion through the at least one gas discharging port prior to and subsequent to the actuation of the inflator;
   a filter that covers the at least one gas discharging port, such that the pressurized medium is discharged from the at least one gas discharging port through the filter;
   a rupturable plate that seals the flow-path, a peripheral portion of the rupturable plate being attached to the diffuser portion and an entire remaining portion of the rupturable plate being apart from any of elements of the inflator; and
   rupturing means provided inside the space and directly opposing the rupturable plate for rupturing the rupturable plate,
   wherein the pressurized medium is discharged through the diffuser portion without being heated.

8. The inflator, according to claim 7 wherein the inflator housing has no scam in a longitudinal direction thereof.

9. An inflator, comprising:
   an inflator housing accommodating a pressurized medium and defining an opening;
   a diffuser portion that covers the opening and is provided with at least one gas discharging port, formed in a peripheral wall of the diffuser portion, for discharging the pressurized medium upon actuation of the inflator, such that pressure inside the diffuser portion is at an atmospheric pressure prior to an activation of the inflator, the diffuser portion defining therein a flow-path that allows the pressurized medium to flow from the inflator housing to the at least one gas discharging port;
   a rupturable plate that seals the flow-path, a peripheral portion of the rupturable plate being attached to the diffuser portion and an entire remaining portion of the rupturable plate being apart from any of elements of the inflator;
   rupturing means, that directly opposes the rupturable plate, for rupturing the rupturable plate; and
   a filter that covers the at least one gas discharging port, such that the pressurized medium is discharged from the at least one gas discharging port through the filter,
   wherein the pressurized medium is discharged through the diffuser portion without being heated.

10. The inflator according to any one of claims 1, 7, and 9, wherein the inflator housing is a pipe having a first end portion that defines the opening, and a closed second end portion.

11. The inflator, according to claim 9, wherein the inflator housing has no seam in a longitudinal direction thereof.

* * * * *